(12) United States Patent
Muthusamy et al.

(10) Patent No.: US 11,604,961 B2
(45) Date of Patent: Mar. 14, 2023

(54) SCALABLE MODEL SERVING

(71) Applicant: International Business Machines Corporation, Armonk, NY (US)

(72) Inventors: Vinod Muthusamy, Austin, TX (US); Parijat Dube, Yorktown Heights, NY (US); Kaoutar El Maghraoui, Yorktown Heights, NY (US); Falk Pollok, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 988 days.

(21) Appl. No.: 16/399,358

(22) Filed: Apr. 30, 2019

(65) Prior Publication Data

US 2020/0349413 A1   Nov. 5, 2020

(51) Int. Cl.
*H04L 23/00* (2006.01)
*G06N 3/04* (2023.01)
*G06N 3/08* (2023.01)

(52) U.S. Cl.
CPC ......... *G06N 3/0445* (2013.01); *G06N 3/0454* (2013.01); *G06N 3/08* (2013.01)

(58) Field of Classification Search
CPC ...... G06N 3/0445; G06N 3/08; G06N 3/0454; G06F 8/41
USPC ........................................................ 375/377
See application file for complete search history.

(56) References Cited

U.S. PATENT DOCUMENTS

| 7,756,335 B2 | 7/2010 | Sternby |
| 7,885,988 B2 | 2/2011 | Bashyam et al. |
| 7,961,960 B2 | 6/2011 | Bashyam et al. |
| 8,700,403 B2 | 4/2014 | Weng et al. |
| 2020/0293291 A1* | 9/2020 | Guan ........................ G06F 8/41 |

OTHER PUBLICATIONS

U.S. Appl. No. 62/817,302, filed Mar. 12, 2019.*
Mel, et al. "The NIST Definition of Cloud Computing". Recommendations of the National Institute of Standards and Technology, Nov. 16. 2015.
Karpathy, A. et al. "Deep Fragment Embeddings for Bidirectional Image Sentence Mapping", Department of Computer Science, Stanford University, Stanford, CA 94305, USA, 2017.
Anonymous, "Unsupervised Word Discovery with Segmental Neural Language Models", Under review as conference paper at ICLR 2019.
Linux Defenders et al., "Reliable, Scalable, and High-Performance Distributed Storage: Distributed Metadata Management", an IP.com Prior Art Database Technical Disclosure, IP.com No. IPCOM000234959D; IP.com Electronic Publication Date: Feb. 19, 2014.

(Continued)

*Primary Examiner* — Phuong Phu
(74) *Attorney, Agent, or Firm* — Peter Edwards, Esq.; McGinn I.P. Law Group, PLLC.

(57) ABSTRACT

A neural network models fragmenting method, system, and computer program product include recursively factoring out common prefixes of models, constructing a hierarchy of decomposed model fragments based on the factoring, and grouping the constructed hierarchy for deployment.

20 Claims, 8 Drawing Sheets

(56) References Cited

OTHER PUBLICATIONS

Linux Defenders et al., "Reliable, Scalable, and High-Performance Distributed Storage: Data Distribution", an IP.com Prior Art Database Technical Disclosure, IP.com No. IPCOM000234958D; IP.com Electronic Publication Date: Feb. 19, 2014.
Anonymously, "Method of Merging Huge Models with Full-Context Using Sparse Model Sections", an IP.com Prior Art Database Technical Disclosure, IP.com No. IPCOM000199646D; IP.com Electronic Publication Date: Sep. 13, 2010.
Anonymously, "Dynamic View of Fragments with Selective Loading Options", an IP.com Prior Art Database Technical Disclosure, IP.com No. IPCOM000197266D; IP.com Electronic Publication Date: Jun. 30, 2010.

\* cited by examiner

SCALABLE MODEL SERVING

BACKGROUND

The present invention relates generally to a neural network models fragmenting method, and more particularly, but not by way of limitation, to a system, method, and computer program product for recursively factoring out common prefixes of the models and deploying the same.

Serving many variants of a neural network model can be expensive to keep all these models loaded in memory waiting to be served.

Conventionally, a popular technique in neural nets is transfer learning, where models trained on one data set are reused when trained with other (usually smaller) datasets. In these cases, often the base layers in the model are kept fixed and only a few of the layers are fine-tuned. The result is that there are many models that share common layers.

SUMMARY

Based on the inventors newly identifying that many models share common layers and that cost is a large issue in neural network models, the inventors have discovered that savings can be had by recursively factoring out common prefixes of the models so they can be loaded into memory once and shared across the models.

In an exemplary embodiment, the present invention provides a computer-implemented neural network models fragmenting method, the method including recursively factoring out common prefixes of models, constructing a hierarchy of decomposed model fragments based on the factoring, and grouping the constructed hierarchy for deployment.

One or more other exemplary embodiments include a computer program product and a system, based on the method described above.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
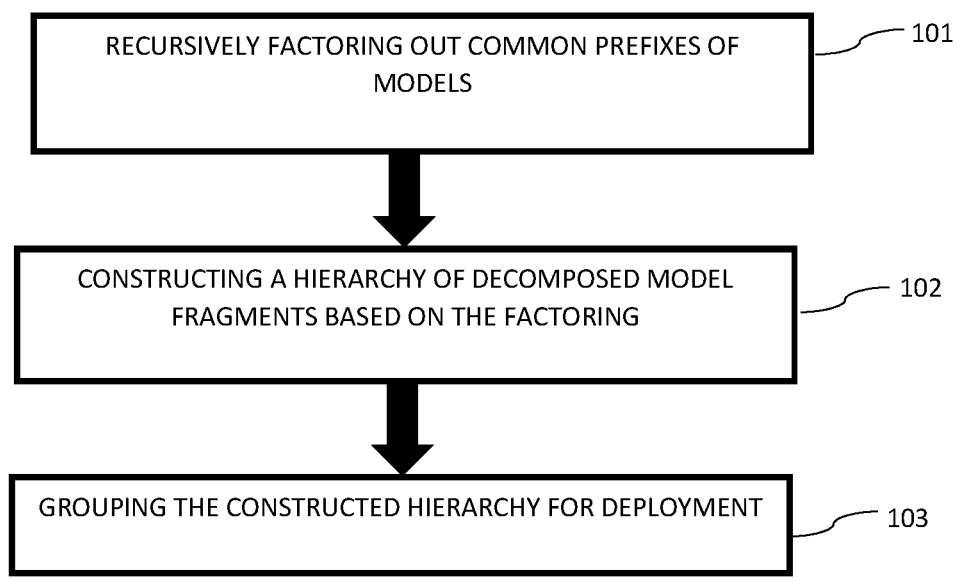
FIG. 1 exemplarily show a high-level flow chart for a neural network models fragmenting method 100 according to an embodiment of the present invention.

The invention will now be described with reference to FIGS. 1-9, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a neural network models fragmenting method 100 according to the present invention can include various steps to reduce cost of model inferencing, reduce memory and other resources, scale to larger number of models and larger models, suspend idle fragments, speed up busy fragments (e.g., deploy on accelerators), amortize cost of accelerators across multiple models, and partition to enable deployment of deep neural networks (Resnet152) on accelerators which may otherwise not fit in accelerator memory.

Figure 7:
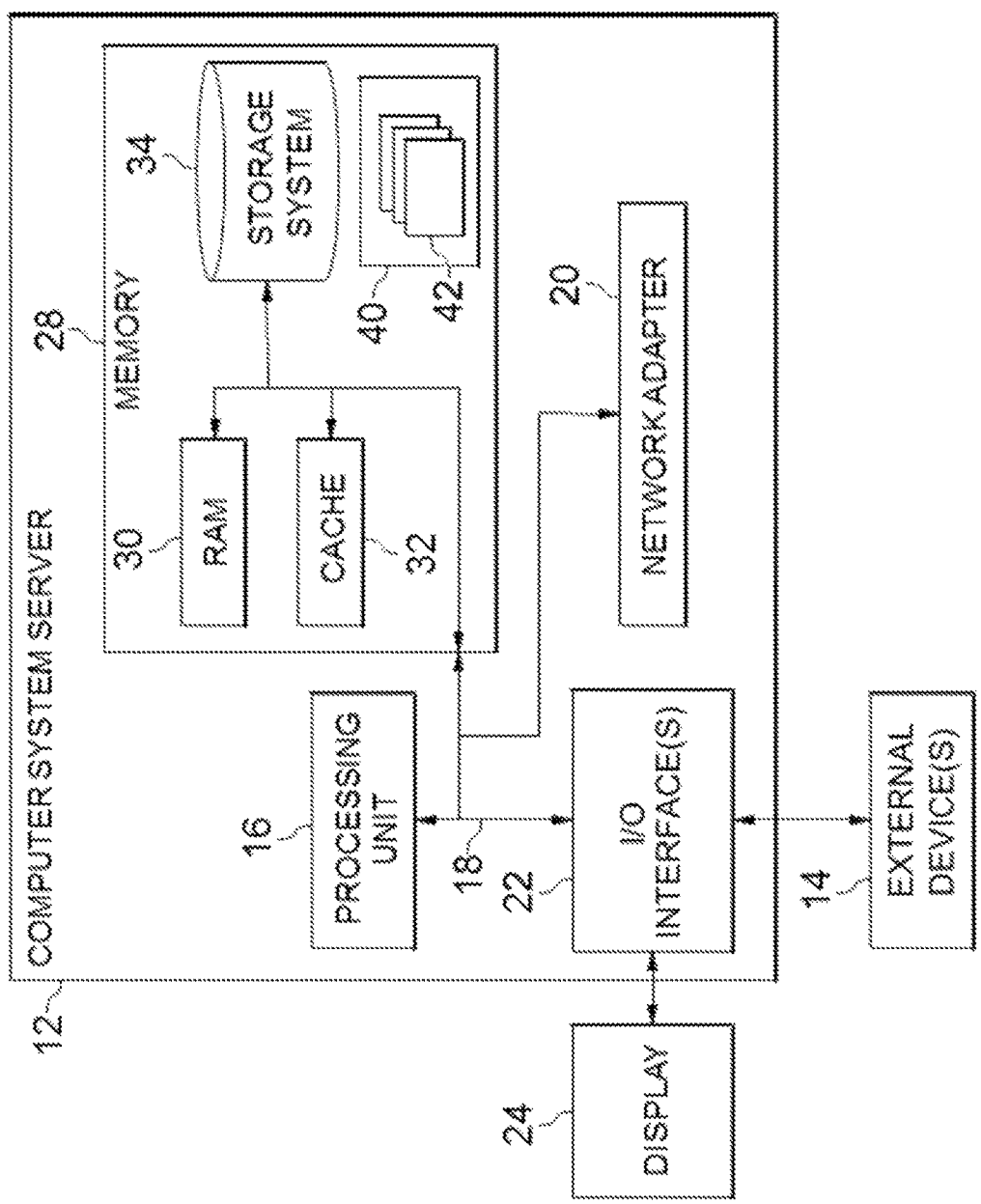
FIG. 7 depicts a cloud-computing node 10 according to an embodiment of the present invention.

By way of introduction of the example depicted in FIG. 7, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 9), it is nonetheless understood that the present invention can be implemented outside of the cloud environment.

With reference generally to FIG. 1, in step 101, common prefixes of neural network models are recursively factored out. That is, the invention exploits the commonality among models. For example, in a neural network model (e.g., ResNet 50), early layers detect low level features showing that they are likely common among models. The factoring can be performed by transfer learning in which early layers of the models are frozen to guarantee commonality.

Figure 2:
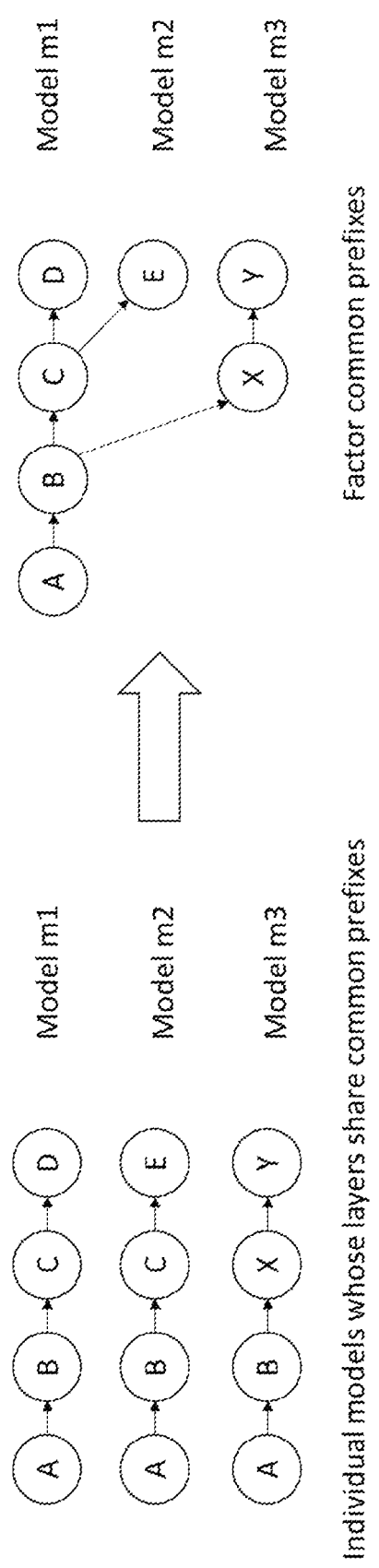
FIGS. 2-3 exemplarily depicts factoring out common prefixes of models according to an embodiment of the present invention.
Figure 3:
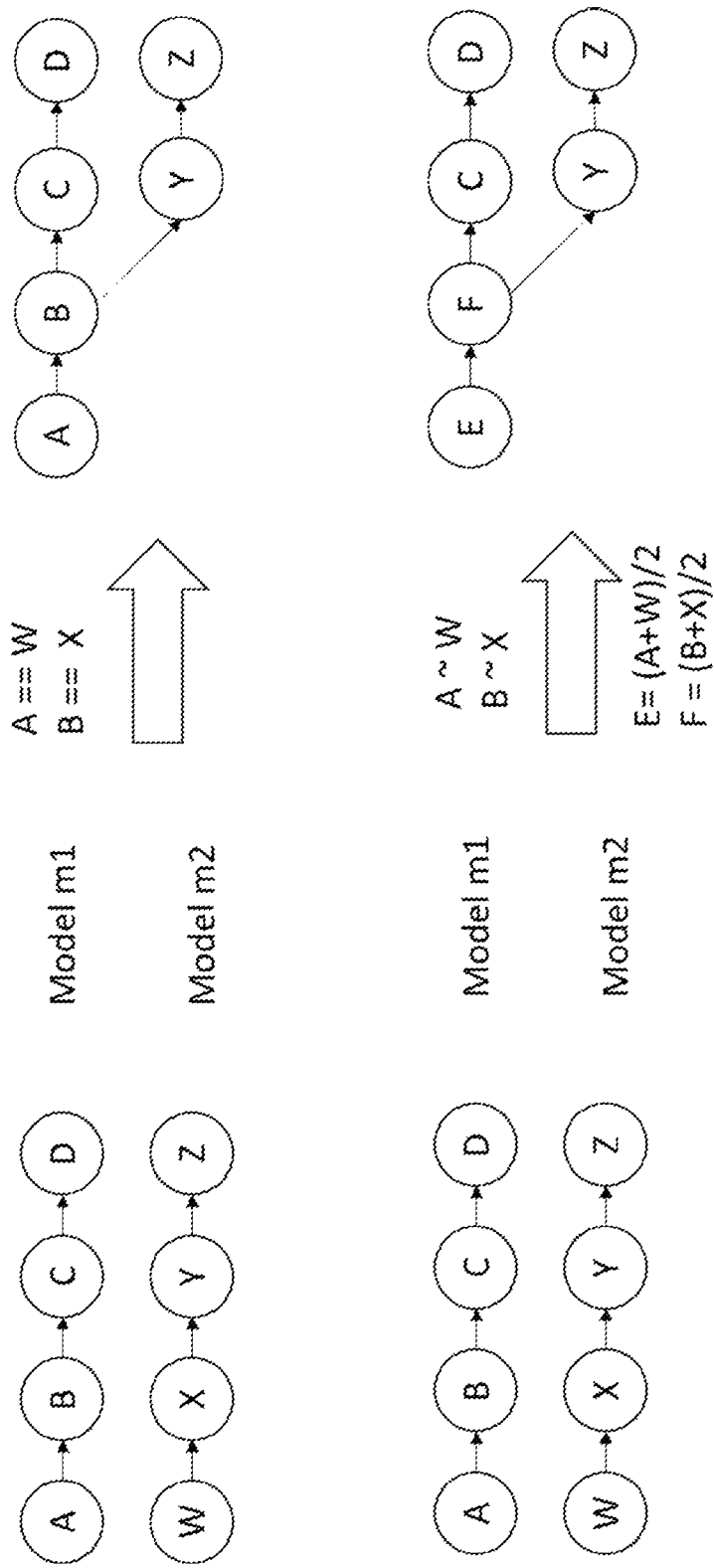

For example, FIGS. 2-3 exemplarily depict factoring according to an embodiment of the invention. In FIG. 2, three example models are shown (i.e., 'model m1', 'model m2', and 'model m3'). Each model has layers that share common prefixes. In step 101, the invention factors out the common prefixes as shown on the right side of FIG. 2. That is, 'A' and 'B' are removed from 'model m2' and 'model m3' and 'C' is removed from 'model m2'.

As a result, as shown in the right half of FIG. 2, the size of the models is decreased thereby reducing a cost to run the models.

FIG. 3 exemplary depicts lossless and lossy factoring as examples of types of factoring. Lossless factoring can be represented as A=A' if A and A' are identical (i.e., same weights, activation function, etc.) and lossy factoring can be represented as A=A' when they are "similar". The top half of FIG. 3 depicts lossless factoring and the bottom half depicts lossy factoring. It is noted that "similar" is such that A and A' are defined to be similar if A and A' are the same size, have the same activation functions, and the weights of A and A' are similar. The inventors consider the weights of A and A' to be similar if DF(A, A')<d, where DF is a function that computes a distance metric between two vectors, such as Euclidean distance, and d is a configurable threshold.

In step 102, a hierarchy of decomposed model fragments is constructed based on the factoring. Factoring here takes as input a set of models and outputs a single model. An input model, M1, is a path data structure, where each node is a model layer, M1-1, M1-2, etc. The output is a tree data structure where each node is a model layer. The output (tree) model has the property that every path from the root node of the tree to a leaf matches a path in one of the input models.

Here is one possible algorithm to construct the output model. Initialize the output model, MO, to be a copy of the first input model M1. Then graft each subsequent input model to MO, each time producing a new output model that is used in the next iteration. Grafting an input model MI to the output model MO requires inserting the MI path to the MO tree. This is done by finding the longest prefix of MI that exists as a path from the root of MO, then inserting the suffix of MI to the end of the path just found in MO.

In step 103, the constructed hierarchy is grouped for deployment. The models may be deployed according to different deployment schemes.

Figure 4:
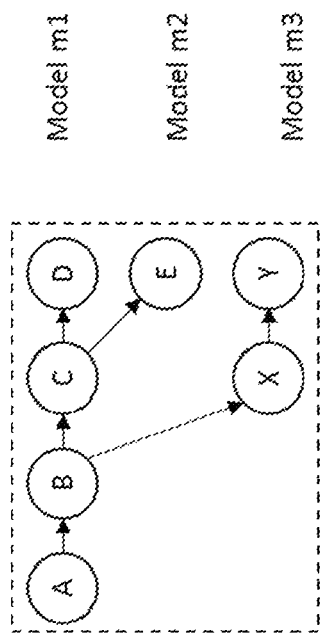
FIG. 4 exemplarily depicts a monolithic deployment according to an embodiment of the present invention.
Figure 5:
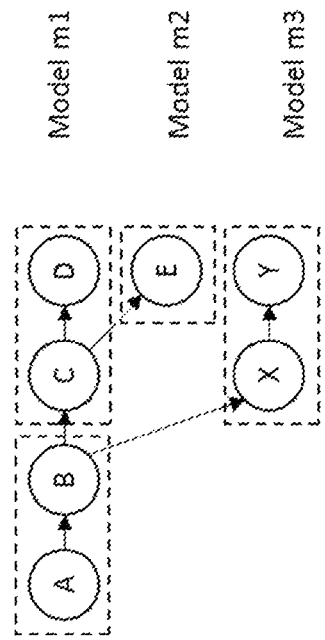
FIG. 5 exemplarily depicts a molecular deployment according to an embodiment of the present invention.
Figure 6:
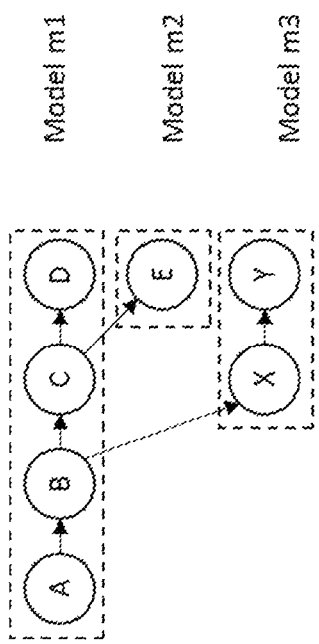
FIG. 6 exemplarily depicts a greedy deployment according to an embodiment of the present invention.

FIG. 4 exemplarily depicts a monolithic grouping strategy that has constraints on total size (e.g. Cloud Functions). In the monolithic grouping strategy, all model outputs are available every time when running the models and there is a high inferencing throughput. The dotted boxes in FIGS. 4-6 represent groups, which are the minimum units of deployment granularity. All layers in a group must be deployed together to one compute unit, such as to one Cloud Function or one GPU accelerator. Note that this still allows multiple groups to be deployed together.

This has high inferencing throughput because all layers from all models are deployed to one compute unit, transferring activations between adjacent nodes in the model that span different groups (and hence can be deployed on different compute units), does not require the overhead of communication between compute unit.

FIG. 5 exemplarily depicts a molecular grouping strategy where each group is entirely used by at least one model. When groups have different workload and throughput requirements, this strategy allows the flexibility of deploying the groups to heterogeneous compute units. The molecular grouping strategy that there is a single path in each group. That is, there is no branching to two nodes in a group.

A possible algorithm to do this is as follows. Create a group consisting only of the root node of the factored output tree MO. If this node has exactly one child node, then expand the current group to include the child. If the node has more than one children, then create a new group for each child. Recursively repeat this procedure until all the nodes in the factored tree have been considered.

FIG. 6 exemplarily depicts a greedy grouping strategy where the grouping strategy factors relative to currently deployed models, which means that fragmentation is a function of model order. In this strategy, there is no need to redeploy models. In the Monolithic and Molecular strategies, the grouping of existing models may change as new models are introduced to the system. Any new groups need to be deployed, and obsolete ones removed.

A trivial example of this is that the introduction of a new model will create a new Monolithic grouping, since the group expands to includes any new unique layers in the new models. This requires replacing the existing deployed group with the expanded one.

And, greedy grouping opportunistically benefits from factoring. The greedy strategy is similar to Molecular but considers each model in sequence, rather than the entire factored tree of all models. This allows it to consider new models without changing the grouping of existing models.

All strategies benefit from factoring. But, greedy is limited in that it only processes each model in the sequence it was introduced to the system and does not modify any existing groups. The Monolithic and Molecular strategies consider the global set of models and can generate more optimal groups.

The grouping strategies of step 103 include freedom on how the fragments in the hierarchy are deployed. The deployment strategy can into account size and usage patterns of the fragments, quality of service requirements of models, and available resources. Consider a set of groups G generated by one of the grouping strategies, and subsequently deployed to compute units. When a new model is added to the system, one of the grouping strategies is applied to generate a new set G' of groups. Groups in G' that also appear in G have already been deployed and can be left in place. Groups in G' that do not appear in G are new groups and need to be deployed. Groups in G that do not appear in G' are obsolete and can be undeployed.

That is, given a factored model, the method 100 includes different ways to decompose the model for deployment. As shown in FIG. 4, the entire factored model is deployed as a single model. This is reasonable if the total size of model can fit in the inferencing infrastructure. For example, Cloud Functions impose a memory limit. It also makes sense if outputs from all three models are required on every input. Compared to deploying and using separate models, this choice reduces memory footprint, and by reusing the computation from the common prefixes, increases inferencing throughput. As shown in FIG. 5, another extreme is to decompose into fragments such that each fragment is entirely used by a model or none at all. This gives more deployment flexibility. For example, the fragment with nodes A and B is used by all models, and will have the highest throughput requirements, so it may be useful to deploy it on a GPU. The latency and throughput requirements and workload patterns can be used to determine the appropriate deployment configuration. And, as shown in FIG. 6, another approach is a greedy one, where the first model is deployed as a unit, and fragments are created for any new layers in subsequent models. This avoids the need to redeploy models, but still opportunistically takes advantage of model factoring.

These techniques provide benefits such as being able to reuse common parts of the model to reduce total memory usage and other resources. This makes the system more scalable with the number of models. Also, the invention allows the ability to swap out or suspend fragments that are not commonly used. And, the more commonly used fragments (likely those at the top of the hierarchy) can be deployed on accelerators and benefit all models that are descendants in the hierarchy. Doing so may justify the cost of deploying these models fragments on expensive hardware. This can also be used in hybrid Cloud environment for caching models. Frequently activated paths can be loaded in mobile or edge devices that are memory constrained while other parts of the models can be kept in a remote server or in the cloud.

Thereby, the invention includes a new technique for factoring-out common prefixes within a scalable model serving environment to provide for better neural network model execution at a lower cost.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 7, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 7, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 8:
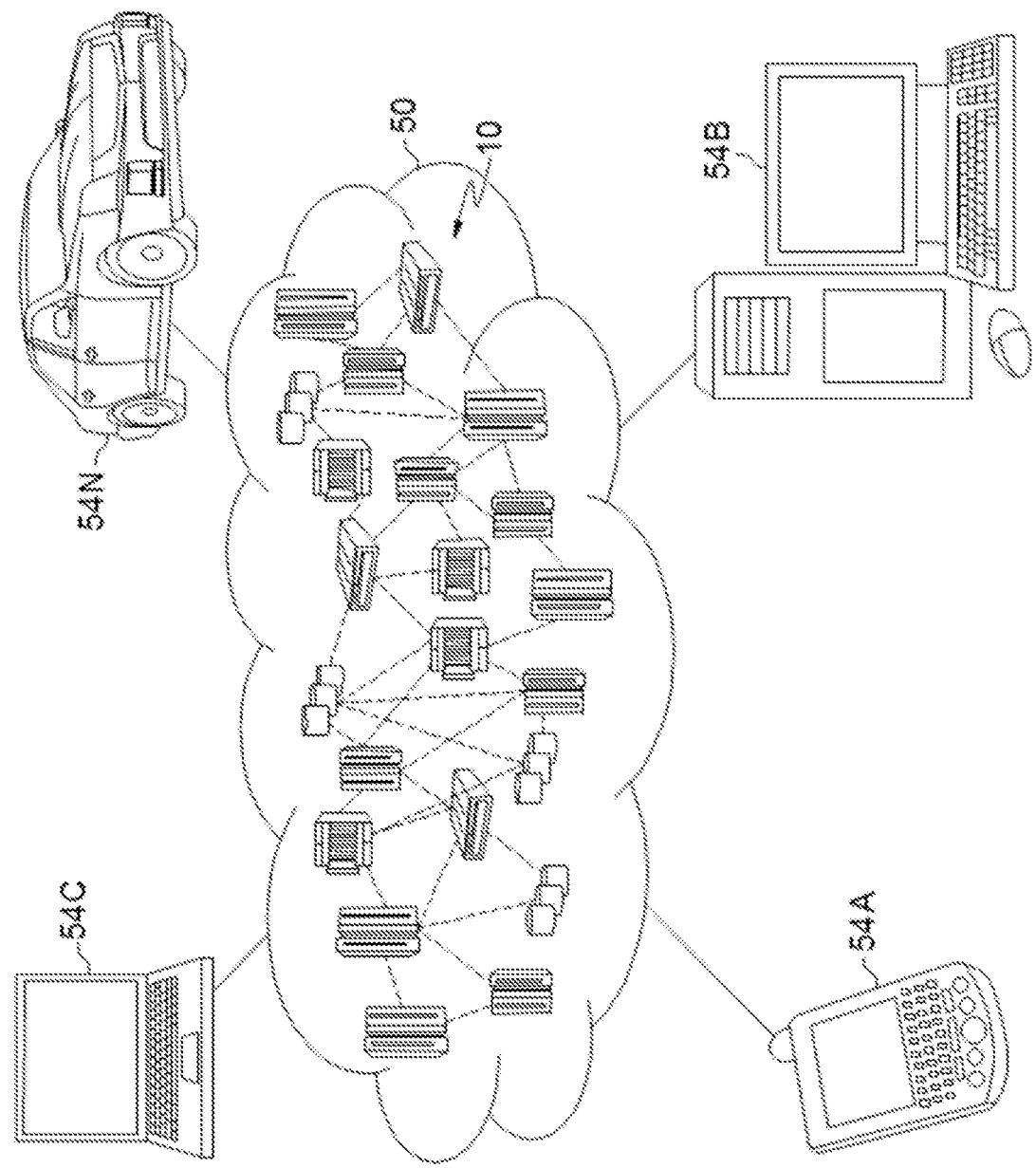
FIG. 8 depicts a cloud-computing environment 50 according to an embodiment of the present invention.

Referring now to FIG. 8, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 8 are intended to be illustrative only and that computing nodes 10 and cloud computing environment 50 can communicate with any type of computerized circuit over any type of network and/or network addressable connection (e.g., using a web browser).

Figure 9:
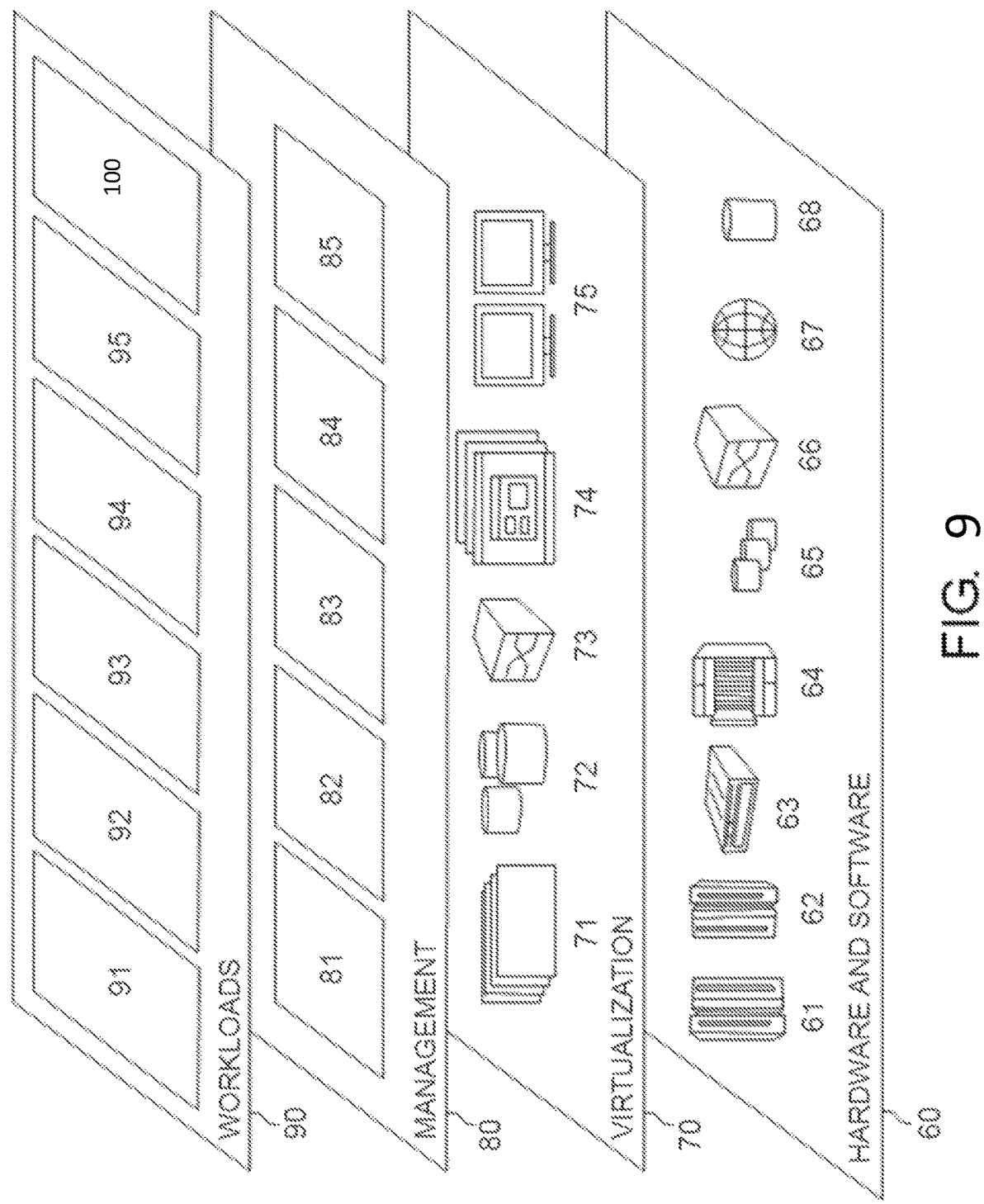
FIG. 9 depicts abstraction model layers according to an embodiment of the present invention.

Referring now to FIG. 9, an exemplary set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and neural network models fragmenting method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented neural network models fragmenting method, the method comprising:
   recursively factoring out common prefixes of a plurality of neural network models;
   constructing a hierarchy of decomposed model fragments based on the factoring; and
   grouping the constructed hierarchy for deployment.

2. The method of claim 1, wherein the factoring is performed by transfer learning where predetermined layers of the models are frozen to guarantee commonality.

3. The method of claim 1, wherein the grouping groups the constructed hierarchy according to a monolithic deployment strategy.

4. The method of claim 3, wherein, in the monolithic deployment strategy, all model outputs are available every time when running the plurality of neural network models.

5. The method of claim 1, wherein the grouping groups the constructed hierarchy according to a molecular deployment strategy.

6. The method of claim 5, wherein, in the molecular deployment strategy, each group of the groups is entirely used by at least one model of the plurality of neural network models.

7. The method of claim 5, wherein, in the molecular deployment strategy, each group of the groups has a different workload and a throughput requirement such that there is a heterogeneous deployment.

8. The method of claim 1, wherein the grouping groups the constructed hierarchy according to a greedy deployment strategy.

9. The method of claim 8, wherein, in the greedy deployment strategy, fragmentation in the deployment is a function of a model order.

10. The method of claim 1, embodied in a cloud-computing environment.

11. A computer program product for neural network models fragmenting, the computer program product comprising a non-transitory computer-readable storage medium having program instructions embodied therewith, the program instructions executable by a computer to cause the computer to perform:
    recursively factoring out common prefixes of a plurality of neural network models;
    constructing a hierarchy of decomposed model fragments based on the factoring; and
    grouping the constructed hierarchy for deployment.

12. The computer program product of claim 11, wherein the factoring is performed by transfer learning where early layers of the models are frozen to guarantee commonality.

13. The computer program product of claim 11, wherein the grouping groups the constructed hierarchy according to a monolithic deployment strategy.

14. The computer program product of claim 13, wherein, in the monolithic deployment strategy, all model outputs are available every time when running the plurality of neural network models.

15. The computer program product of claim 11, wherein the grouping groups the constructed hierarchy according to a molecular deployment strategy.

16. The computer program product of claim 15, wherein, in the molecular deployment strategy, each group of the groups is entirely used by at least one model of the plurality of neural network models.

17. The computer program product of claim 15, wherein, in the molecular deployment strategy, each group of the groups has a different workload and a throughput requirement such that there is a heterogeneous deployment.

18. The computer program product of claim 11, wherein the grouping groups the constructed hierarchy according to a greedy deployment strategy.

19. A neural network models fragmenting system, the system comprising:
    a processor; and
    a memory, the memory storing instructions to cause the processor to perform:
       recursively factoring out common prefixes of a plurality of neural network models;
       constructing a hierarchy of decomposed model fragments based on the factoring; and
       grouping the constructed hierarchy for deployment.

20. The system of claim 19, embodied in a cloud-computing environment.

* * * * *